United States Patent
Simpson (10) Patent No.: US 10,975,770 B1
(45) Date of Patent: Apr. 13, 2021

(54) INTEGRAL ENGINE CASE PRECOOLER

(71) Applicant: Hamilton Sundstrand Corporation, Charlotte, NC (US)

(72) Inventor: Christopher Simpson, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/704,819

(22) Filed: Dec. 5, 2019

(51) Int. Cl.
*F02C 7/18* (2006.01)
*F01D 25/14* (2006.01)

(52) U.S. Cl.
CPC ............... *F02C 7/18* (2013.01); *F01D 25/14* (2013.01); *F05D 2260/213* (2013.01); *F05D 2260/232* (2013.01)

(58) Field of Classification Search
CPC ............. F01D 25/14; F02C 6/08; F02C 7/185
See application file for complete search history.

(56) References Cited

U.S. PATENT DOCUMENTS

| | | | |
|---|---|---|---|
| 6,625,989 B2 | 9/2003 | Boeck | |
| 8,434,997 B2 | 5/2013 | Pinero et al. | |
| 9,777,636 B2 | 10/2017 | Morrill | |
| 10,094,285 B2 | 10/2018 | Munshi et al. | |
| 2013/0294883 A1* | 11/2013 | Ballard, Jr. | ............ F01D 25/12 415/1 |
| 2017/0314416 A1 | 11/2017 | Sharma et al. | |
| 2018/0156056 A1 | 6/2018 | Bonacum et al. | |

* cited by examiner

*Primary Examiner* — Gerald L Sung
*Assistant Examiner* — Alyson Joan Harrington
(74) *Attorney, Agent, or Firm* — Kinney & Lange, P.A.

(57) ABSTRACT

A heat exchanging arrangement is integrated within a gas turbine engine case that at least partially encloses a gas turbine engine. The gas turbine engine has an upstream end and a downstream end which are defined by a core fluid flow through the gas turbine engine. The heat exchanging arrangement includes at least one flow passage defined within the gas turbine engine case having an inlet port and an outlet port. The at least one flow passage is configured to direct at least a portion of a fluid flowing through the gas turbine engine from between a downstream position and an upstream position while traveling between the inlet port and the outlet port.

16 Claims, 4 Drawing Sheets

INTEGRAL ENGINE CASE PRECOOLER

BACKGROUND

The present disclosure relates to gas turbine engines, and in particular, to an integral engine case precooler that can provide cooling of air that is discharged from a gas turbine engine.

Gas turbine engines are widely used in aircraft propulsion, electric power generation, and ship propulsion. In all gas turbine engine applications, efficiency is a prime objective. Improved gas turbine engine efficiency can be obtained by operating at higher temperatures, necessitating the provision of cooling for components in the hottest portions of gas turbine engines, typically in the turbine section. Cooling is provided by flowing relatively cool air from the compressor section of the engine through passages in the turbine components to be cooled. Moreover, some compressor stage discharge air is typically diverted to be provided to other systems (i.e., downstream components) for various purposes including actuation and control, heat exchange, and for providing cabin air. During operation, compressor stage discharge air is at a temperature that is higher than is desired for some purposes, thereby requiring that the diverted discharge air flow through an external heat exchanger for cooling to a lower temperature. Hot air can also be drawn from other components on a gas turbine engine (e.g., turbine discharge), requiring cooling. Therefore, the space and cooling requirements of downstream components (e.g., an external heat exchanger) must be considered in the design of a gas turbine engine. The higher operating temperatures that provide improved gas turbine engine efficiency can place greater demands on the space and/or cooling requirements of an external heat exchanger that is used for cooling the diverted compressor stage discharge air.

SUMMARY

A heat exchanging arrangement is integrated within a gas turbine engine case that at least partially encloses a gas turbine engine. The gas turbine engine has an upstream end and a downstream end which are defined by a core fluid flow through the gas turbine engine. The heat exchanging arrangement includes at least one flow passage defined within the gas turbine engine case having an inlet port and an outlet port. The at least one flow passage is configured to direct at least a portion of a fluid flowing through the gas turbine engine from between a downstream position and an upstream position while traveling between the inlet port and the outlet port.

A method of using a heat exchanging arrangement that is integrated within a gas turbine engine case to cool a portion of an airflow received from an inlet port is described. The gas turbine engine case at least partially encloses a gas turbine engine which has an upstream end and a downstream end which are defined by a core fluid flow through the gas turbine engine. The heat exchanging arrangement includes at least one flow passage defined within the gas turbine engine case having an inlet port and an outlet port. The at least one flow passage is configured to direct at least a portion of a fluid flowing through the gas turbine engine from between a downstream position and an upstream position while traveling between the inlet port and the outlet port. The method includes operating the gas turbine engine to pressurize the airflow received at the inlet port, directing the portion of the airflow through the inlet port, the heat exchanging arrangement, and the outlet port, and discharging the portion of the airflow from the outlet port to one or more other systems.

DETAILED DESCRIPTION

The present disclosure is directed to an integral engine case precooler that can be adapted to providing precooling of gas turbine engine discharge air that can be provided from a compressor or a turbine. The precooler can be referred to as an integral precooler or a heat exchanging arrangement. The discharge air that flows through the integral engine case precooler can be referred to as precooled discharge air, or as the heat exchanging arrangement flow. This precooled discharge air, having a temperature that is lower than without precooling, can be directed to other systems. When the precooled discharge air is directed to a heat exchanger for additional cooling, the cooling requirement for the heat exchanger can be less than if the integral engine case precooler were not used. In some embodiments, the precooled discharge air can be directed to various downstream components without first passing through a heat exchanger (i.e., a heat exchanger in addition to the integral engine case precooler). Non-limiting examples of a downstream component that can receive precooled discharge air include a heat exchanger, a valve, an actuation system, ducting, and a sensing device. Accordingly, the precooled discharge air that is supplied to a downstream component can be referred to as a working fluid. The exemplary embodiment in the present disclosure illustrates precooling of gas turbine engine compressor stage discharge air received from a high-pressure compressor. In other embodiments, discharge air can be received from a low-pressure compressor, from a turbine discharge, or any other source of hot air or other gas.

Figure 1:
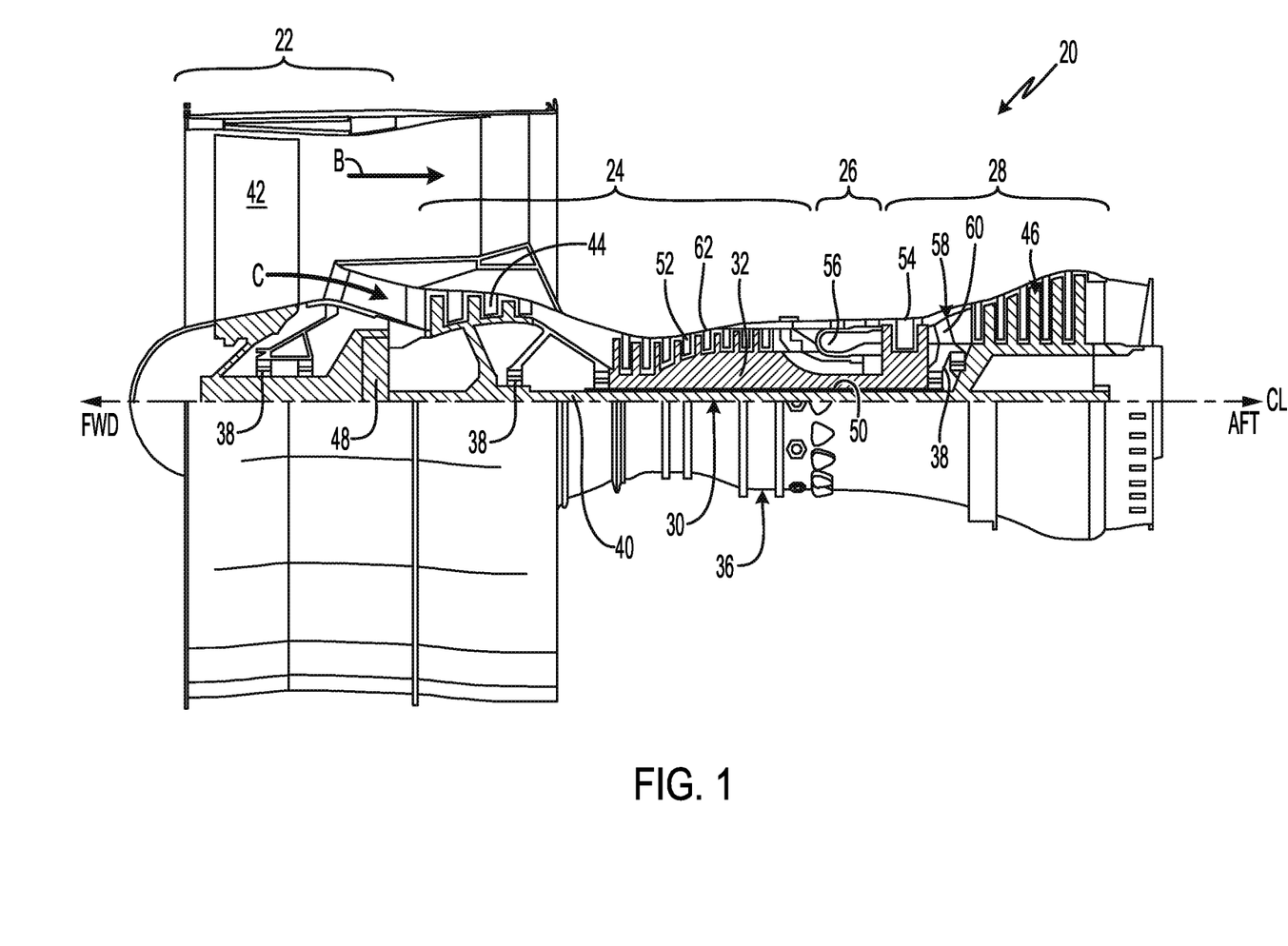
FIG. 1 is a partial cross-sectional side view of a gas turbine engine with an integral engine case precooler.

FIG. 1 is a partial cross-sectional side view of a gas turbine engine with an integral engine case precooler that schematically illustrates exemplary gas turbine engine 20 that includes fan section 22, compressor section 24, combustor section 26 and turbine section 28. Also shown in FIG. 1 are low speed spool 30, high speed spool 32, engine static structure 36, bearing system 38, inner shaft 40, fan 42, low pressure compressor section 44, low pressure turbine section 46, geared architecture 48, outer shaft 50, high pressure compressor section 52, high pressure turbine section 54, combustor 56, mid-turbine frame 58, turbine vane 60, and precooler 62. Center axis CL, bypass flowpath B, core flowpath C, forward (fwd) and aft directions are also labeled in FIG. 1. Alternative engines might include an augmenter section (not shown) among other systems or features. Fan section 22 drives air along bypass flowpath B while compressor section 24 draws air in along core flowpath C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The exemplary gas turbine engine 20 generally includes low speed spool 30 and high speed spool 32 mounted for rotation about center axis CL of gas turbine engine 20 relative to engine static structure 36 via several bearing systems 38. It should be understood that various bearing systems 38 at various locations may alternatively or additionally be provided. Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about center axis CL. Combustor 56 is arranged between high pressure compressor 52 and high pressure turbine 54. In one example, high pressure turbine 54 includes at least two stages to provide double stage high pressure turbine 54. In another example, high pressure turbine 54 includes only a single stage. As used herein, a "high pressure" compressor or turbine experiences a higher pressure than a corresponding "low pressure" compressor or turbine. Mid-turbine frame 58 of engine static structure 36 can be arranged generally between high pressure turbine 54 and low pressure turbine 46. Mid-turbine frame 58 further supports bearing systems 38 in turbine section 28 as well as setting airflow entering the low pressure turbine 46. The gas flow in core flowpath C is compressed first by low pressure compressor 44 and then by high pressure compressor 52, then mixed with fuel and ignited in combustor 56 to produce high speed exhaust gases that are then expanded through high pressure turbine 54 and low pressure turbine 46. Mid-turbine frame 58 includes vanes 60, which are in the core flowpath and function as an inlet guide vane for low pressure turbine 46. In the illustrated embodiment, precooler 62 provides precooling of high pressure compressor section 52 discharge air that is diverted from gas turbine engine 20. In other embodiments, precooler 62 can provide precooling of low pressure compressor section 44 discharge air that is diverted from gas turbine engine 20. Precooler 62 will be shown and described in greater detail in FIGS. 2A-2B and 3-4.

Figure 2A:
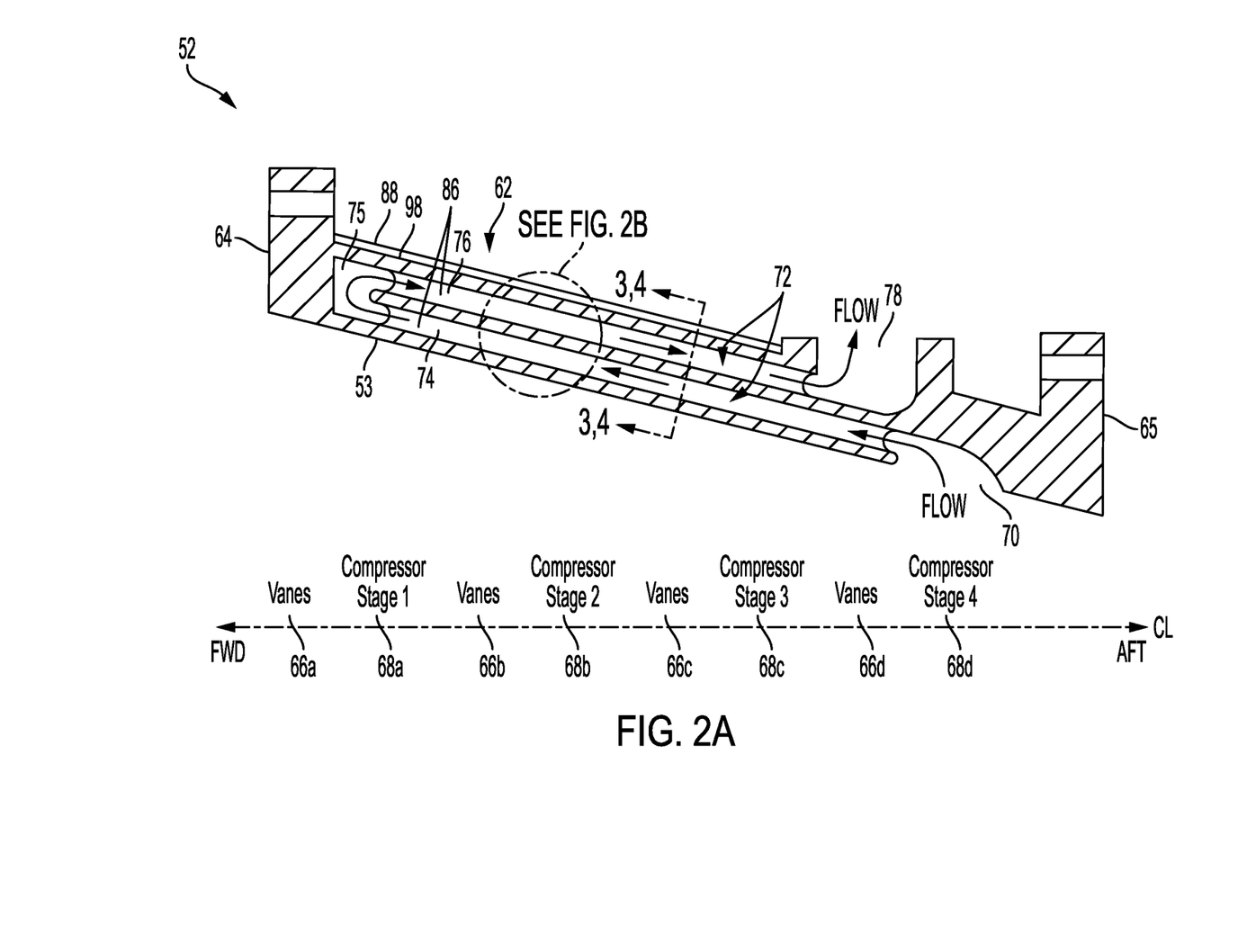
FIG. 2A is a partial cross-sectional side view of the integral engine case precooler shown in FIG. 1.
Figure 2B:
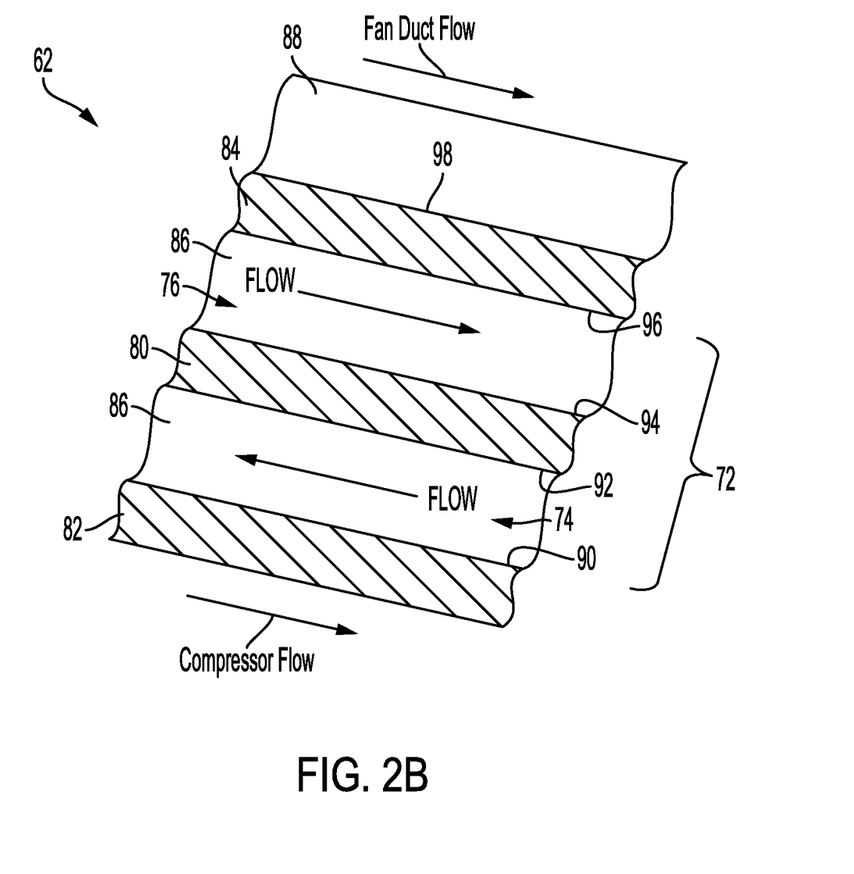
FIG. 2B is an enlarged section of the integral engine case precooler shown in FIG. 2A.

FIG. 2A is a partial cross-sectional side view of integral engine case precooler 62 shown in FIG. 1. FIG. 2B is an enlarged section of integral engine case precooler 62 shown in FIG. 2A. Shown in FIGS. 2A-2B are high pressure compressor section 52, engine case 53, precooler 62, forward flange 64, aft flange 65, compressor vanes 66a, 66b, 66c, 66d, compressor first stage 68a, compressor second stage 68b, compressor third stage 68c, compressor fourth stage 68d, precooler inlet 70, interpass region 72, first pass channel 74, turnabout region 75, second pass channel 76, precooler outlet 78, flow divider 80, interior wall 82, exterior wall 84, interior wall interpass surface 90, flow divider first pass surface 92, flow divider second pass surface 94, exterior wall interpass surface 96, and engine case exterior surface 98. Center axis CL is also labeled in FIG. 2A. Fan duct flow and compressor flow are also labeled in FIG. 2B. During operation of gas turbine engine 20, the airflow through high pressure compressor section 52 increases in both pressure and temperature from one stage to the next higher stage (e.g., from compressor first stage 68a to compressor second stage 68b). The operating temperature can be depicted as $T_n$, where n is the stage number (e.g., $T_1$ is the operating temperature of first compressor stage 68a). Accordingly, the operating temperature relationship in high pressure compressor section 52 can be depicted by the inequality relationship shown in equation 1:

$$T_1 < T_2 < T_3 < T_4 \qquad \text{Equation 1:}$$

In the exemplary embodiment of the present disclosure, precooler 62 is configured to receive discharge air from high pressure compressor section 52. In some embodiments, precooler 62 can be configured to receive discharge air from low pressure compressor section 44. In other embodiments, precooler 62 can be configured to receive discharge air from any stage of any compressor, turbine, or other source of heated gas (e.g., air). The temperature relationships in equation 1 apply to a compressor. It is to be appreciated that an inverse temperature relationship can apply to the stages of a turbine (not shown). Referring again to FIG. 2A, precooler 62 is integral to engine case 53 and can be referred to as an integral engine case precooler. Engine case 53 has an annular structure surrounding high pressure compressor section 52, having forward flange 64 at the forward end and aft flange 65 at the aft end. It is to be appreciated that various components of gas turbine engine 20 are manufactured as separate assemblies which are then assembled to form gas turbine engine 20. Accordingly, forward and aft flanges 64, 65 can be used to attach high pressure compressor section 52 to other components of gas turbine engine 20.

In the illustrated embodiment, high pressure compressor section 52 includes four stages (i.e., compressor first stage 68a, compressor second stage 68b, compressor third stage 68c, and compressor fourth stage 68d), with compressor air flow being in the direction from left to right as shown in FIG. 2A (i.e., from forward to aft). In an exemplary embodiment, engine case 53 with precooler 62 is manufactured using an additive manufacturing process, with laser powder bed fusion (LPBF) being a non-limiting exemplary additive-manufacturing process. Other exemplary additive manufacturing processes include use electron beam melting (EBM), laser beam melting (LBM), direct metal laser sintering (DMLS), selective laser sintering (SLS), powder bed fusion (PBF), sheet lamination, directed energy deposition, binder jetting, and material extrusion. Engine case 53 with precooler 62 can be made of a metallic material, with non-limiting examples being nickel, aluminum, titanium, copper, iron, cobalt, and all alloys that include these various metals. In some embodiments, a high-temperature super alloy can be used. In some embodiments, various alloys of INCONEL™ can be used, with non-limiting examples being Inconel 625 and Inconel 718. Other exemplary alloys include WASPALOY™ and HAYNES™ 282. All materials that include metals, metal oxides, and alloys thereof are within the scope of the present disclosure. In other embodiments, a nonmetallic material can be used to fabricate engine case 53 with precooler 62. All materials that can be used to make engine case 53 with precooler 62, by any manufacturing process, are within the scope of the present disclosure. After manufacturing, engine case 53 with precooler 62 is mounted within gas turbine engine 20 using forward and aft flanges 64, 65.

Referring again to FIGS. 2A-2B, during operation of gas turbine engine 20, air flows from a discharge of compressor fourth stage 68d through precooler 62 by entering precooler inlet 70, flowing through interpass region 72, and exiting precooler outlet 78. Precooler inlet 70 can be referred to as an inlet port, and is configured to receive a flow of air from a compressor. Precooler outlet 78 can be referred to as an outlet port, and is configured to deliver flow of precooled air to any other system for any various purpose, as described earlier. In an embodiment, precooler 62 can include one or more precooler inlets 70 (inlet ports) and one or more precooler outlets 78 (i.e., outlet ports). Interpass region 72 includes first pass channel 74 and second pass channel 76, each being partially formed by flow divider 80. Interpass region 72 is partially formed by interior wall 82 and exterior wall 84, as shown in FIG. 2B. Accordingly, the flow through first pass channel 74 is contained by interior wall 82 and flow divider 80. Similarly, the flow through second pass channel 76 is contained by flow divider 80 and exterior wall 84. Flow transitions from first pass channel 74 into second pass channel 76 at turnabout region 75, whereby the flow direction reverses. Hot air from compressor fourth stage 68d having temperature $T_4$ enters precooler 62 at precooler inlet 70 and flows through first pass channel 74, moving in a direction toward the earlier compressor stages 68, each having a successively lower operating temperature. Airflow through first pass channel 74 is generally in a direction from aft to forward (i.e., opposite that of core flowpath C as shown in FIG. 1). As air flows through first pass channel 74, heat is transferred into interior wall 82 which is at a successively lower temperature moving toward earlier compressor stages 68, thereby cooling the air flowing through first pass channel 74. Flow reverses direction while moving through turnabout region 75 into second pass channel 76, thereby flowing is a direction that is counter to the flow through first pass channel 74. Accordingly, airflow through second pass channel 76 is generally in a direction from forward to aft (i.e., similar to that of core flowpath C as shown in FIG. 1). As air flows through second pass channel 76, in the illustrated embodiment, additional cooling can occur by transferring heat to exterior wall 84. During operation of gas turbine engine 20, bypass flowpath B (as shown in FIG. 1) provides cooling of engine case exterior surface 98, thereby removing heat from exterior wall 84. Engine case exterior surface 98 will be shown and described in greater detail later, in FIG. 3.

Figure 3:
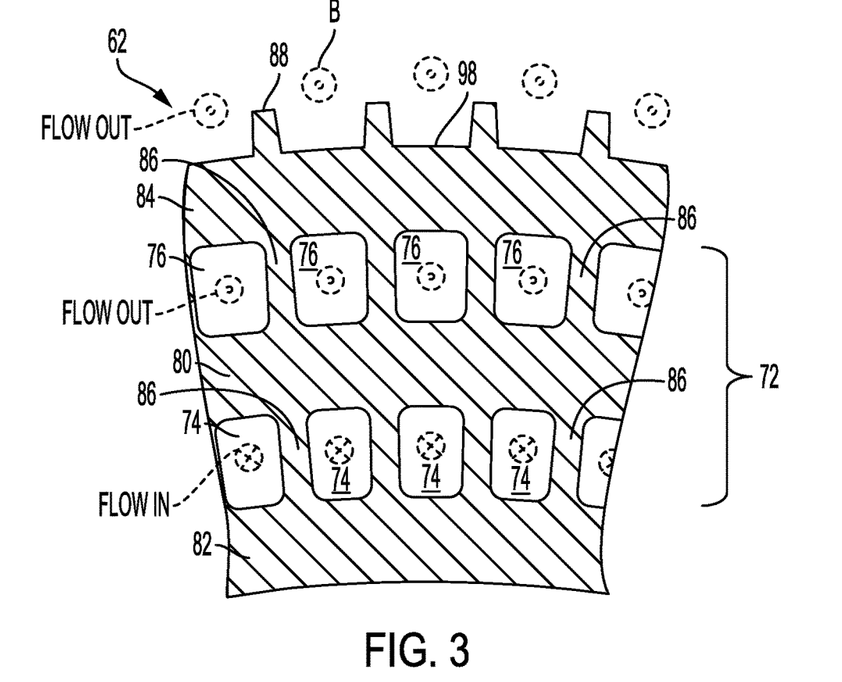
FIG. 3 is a partial cross-sectional end view of the integral engine case precooler shown in FIG. 2A.

FIG. 3 is a partial cross-sectional end view of precooler 62 shown in FIG. 2A, taken along cut line 3-3. Shown in FIG. 3 are engine case 53, precooler 62, interpass region 72, first pass channel 74, second pass channel 76, flow divider 80, interior wall 82, exterior wall 84, interpass vanes 86, exterior vanes 88, and engine case exterior surface 98. Directions of air flow are also shown in FIG. 3. The description of interpass region 72, first pass channel 74, second pass channel 76, flow divider 80, interior wall 82, and exterior wall 84 are substantially as provided above in regard to FIGS. 2A-2B. In the illustrated embodiment, several interpass vanes 86 are located in first pass channel 74, extending from interior wall 82 to flow divider 80. Similarly, several interpass vanes 86 are located in second pass channel 76, extending from flow divider 80 to exterior wall 84. Interpass vanes 86 support flow divider 80 between interior wall 82 and exterior wall 84 (i.e., within engine case 53), thereby providing structural rigidity while maintaining the physical dimensions of first pass channel 74, second pass channel 76, and engine case 53. In some embodiments, interpass vanes 86 also enhance heat transfer in first and/or second pass channels 74, 76 by providing a thermal conduction path through interpass region 72 (i.e., between interior wall 82 and exterior wall 84). In other embodiments, interpass vanes 86 can also enhance heat transfer by creating turbulence in air flow through first and/or second pass channels 74, 76. In some of these other embodiments, interpass vanes 86 can include additional flow-enhancing and/or turbulence-generating features, with non-limiting examples sinuous shapes (i.e., waviness), turbulators, riblets, trip strips, and other texturing along some or all portions of one or more interpass vanes 86.

Referring again to FIG. 3, flow divider 80, interior wall 82, and exterior wall 84 each have a curvature, which corresponds to the annular shape of engine case 53. Additional aspects of precooler 62 will be shown and described in more detail later, in FIG. 4. Air flow in first pass channel 74 is depicted into the page as shown in FIG. 3, and air flow in second pass channel 76 is depicted out of the page. Exterior vanes 88 extend outward from engine case exterior surface 98. Bypass flowpath B is depicted in FIG. 3 flowing outward from the page over engine case exterior surface 98, flowing along exterior vanes 88. Bypass flowpath B provides cooling of engine case exterior surface 98, thereby removing heat from exterior wall 84 as described above in regard to FIGS. 2A-2B. Exterior vanes 88 provide a greater surface area for convective heat transfer from engine case exterior surface 98, thereby providing a greater rate of heat transfer from engine case 53. Accordingly, greater cooling is provided in second pass channel 76, as described above in regard to FIGS. 2A-2B.

Figure 4:
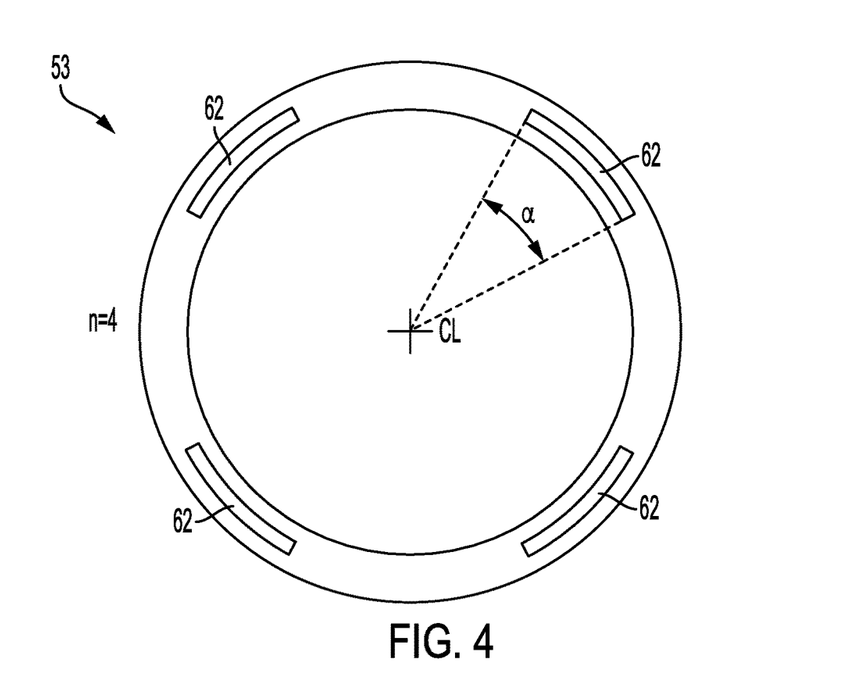
FIG. 4 is a schematic cross-sectional end view of an engine case shown in FIG. 2A.

FIG. 4 is a schematic cross-sectional end view of engine case 53 shown in FIG. 2A, taken along cut line 4-4. FIG. 4 schematically depicts four precoolers 62 within engine case 53. Shown in FIG. 4 are engine case 53 precoolers 62. Also labeled in FIG. 4 are center axis CL and precooler circumferential arc α. It is to be appreciated that FIG. 4 is provided to schematically show the circumferential orientation of several precoolers 62, and it is not a full cross-sectional drawing of engine case 53. In the embodiment shown in FIG. 4, engine case 53 includes four precoolers 62 arranged circumferentially and spaced about equally from the others. Each precooler 62 has a circumferential dimension of precooler circumferential arc α. In the illustrated embodiment, precooler circumferential arc α is about 30 degrees, thereby providing a circumferential spacing of about 60 degrees between adjacent precoolers 62. Accordingly, a precooler loading factor F can be defined as the ratio of the total of precooler circumferential arcs α to a full circumferential dimension (i.e., 360 degrees), as shown in equation 2, where n is the number of precoolers 62 and $α_x$ is the particular value of precooler circumferential arc a for a particular precooler 62. :

$$F = \frac{\sum_{x=1}^{n} α_x}{360 \text{ degrees}} \qquad \text{Equation 2}$$

In equation 2, the expression $$\sum_{x=1}^{n} \alpha_x$$

can be referred to as the cumulative circumferential arc. Precooler loading factor F can be expressed as a percentage. Accordingly, in the illustrated embodiment, n=4, each precooler 62 has precooler circumferential arc α of about 30 degrees, the cumulative circumferential arc is about 120 degrees, and precooler loading factor F is about 33%. In some embodiments, either fewer than or more than four precoolers 62 can be used. In an exemplary embodiment, as few as one precooler 62 can be used. In other embodiments, an unlimited number of precoolers 62 can be used. In some embodiments, precooler loading factor F can range from about 20-50%. In other embodiments, precooler loading factor F can range from about 10-80%. In various embodiments, precooler loading factor F can range anywhere from 0-100%, with all values of precooler loading factor F being within the scope of the present disclosure. A value of 0% means that no precoolers 62 are on a particular engine case 53, while a value of 100% means that one or more precoolers 62 fully surround a particular engine case 53. Higher values of precooler loading factor F can provide greater precooling of compressor stage discharge air. On the other hand, lower values of precooler loading factor F can provide greater structural strength and/or rigidity of engine case 53. Accordingly, in a particular embodiment, the number n of precoolers 62 and/or the value of precooler loading factor F will depend on many factors, with non-limiting examples including the operating temperatures and pressures of the particular compressor, the material that engine case 53 is made of, the physical dimensions (e.g., thicknesses) of engine case 53, interior wall 82, and exterior wall 84, the size and configuration of interpass vanes 86, and the desired rate of heat transfer through precooler 62. In the illustrated embodiment, precooler circumferential arc α is about 30 degrees. In some embodiments, precooler circumferential arc α can range from about 15-90 degrees. In other embodiments, precooler circumferential arc α can range from about 5-180 degrees. In various embodiments, precooler circumferential arc α can range from 0-360 degrees. All values of precooler circumferential arc α are within the scope of the present disclosure. Moreover, in a particular embodiment where two or more precoolers 62 are used, each precooler 62 can be different (e.g., different value of precooler circumferential arc α) from any of the others. A grouping of precoolers 62 within engine case 53 can be referred to as a precooler arrangement, or as an integrated precooler arrangement.

In the embodiment shown and described in above, precooler 62 provided precooling of air by transferring heat to interior wall 82 (i.e., being cooled by compressor flow) and to exterior wall 84 (i.e., being cooled by fan duct flow). In the illustrated embodiment, compressor flow and fan duct flow are both in a general direction from forward to aft through gas turbine engine 20. Accordingly, flow through first pass channel 74 is in a direction generally opposite of the directions of compressor flow and fan duct flow, while flow through second pass channel 76 is in a direction generally the same directions of compressor flow and fan duct flow. In some embodiments, precooler 62 can be oriented differently with regard to compressor flow and/or fan duct flow. As a non-limiting example, if precooler 62 were configured to provide precooling of turbine discharge air, then the relative directions of flow through first and second pass channels 74, 76 could be reversed. In other embodiments, precooler 62 could be configured to transfer heat to only interior wall 82 or to exterior wall 84. For example, in some of these other embodiments, a negligible heat sink (i.e., lower temperature source of heat removal) could be available to exterior wall 84 or interior wall 82. In yet other embodiments, precooler 62 could be configured to transfer heat to a fluid other than air. Non-limiting examples of other heat transfer fluids include fuel and oil.

Discussion of Possible Embodiments

The following are non-exclusive descriptions of possible embodiments of the present invention.

A heat exchanging arrangement integrated within a gas turbine engine case, the gas turbine engine case at least partially enclosing a gas turbine engine, the gas turbine engine having an upstream end and a downstream end defined by a core fluid flow through the gas turbine engine, the heat exchanging arrangement comprising: at least one flow passage defined within the gas turbine engine case having an inlet port and an outlet port, the at least one flow passage being configured to direct at least a portion of a fluid flowing through the gas turbine engine from between a downstream position and an upstream position while traveling between the inlet port and the outlet port.

The heat exchanging arrangement of the preceding paragraph can optionally include, additionally and/or alternatively, any one or more of the following features, configurations and/or additional components:

A further embodiment of the foregoing heat exchanging arrangement, further comprising an interpass region disposed between the inlet port and the outlet port within the gas turbine engine case, the interpass region comprising: a first pass channel; a flow divider; a turnabout region; and a second pass channel; wherein: the flow divider is configured to provide a fluid separation between the first pass channel and the second pass channel; the interpass region is configured to direct a fluid flow through the first pass channel, the turnabout region, and the second pass channel, thereby defining a heat exchanging arrangement flow; and the outlet port is configured to discharge the heat exchanging arrangement flow to one or more other systems.

A further embodiment of the foregoing heat exchanging arrangement, wherein: the heat exchanging arrangement defines an interior wall and an exterior wall; the interior wall partially forms a fluid boundary for the first pass channel; and the exterior wall partially forms a fluid boundary for the second pass channel.

A further embodiment of the foregoing heat exchanging arrangement, wherein: the interior wall defines an interior wall interpass surface; the flow divider defines a flow divider first pass surface and a flow divider second pass surface; and the exterior wall defines an exterior wall interpass surface.

A further embodiment of the foregoing heat exchanging arrangement, wherein: the flow divider is structurally supported between the interior wall and the exterior wall by a plurality of support vanes; and the flow divider and the plurality of support vanes are integral to the gas turbine engine case.

A further embodiment of the foregoing heat exchanging arrangement, wherein at least some of the plurality of support vanes are configured to enhance heat transfer in the first and/or second pass channels.

A further embodiment of the foregoing heat exchanging arrangement, wherein: the inlet port is configured to receive the heat exchanging arrangement flow from a higher temperature stage of a compressor; and the heat exchanging arrangement flow through the first pass channel is cooled while flowing from a region near the compressor higher temperature stage to a region near a compressor lower temperature stage.

A further embodiment of the foregoing heat exchanging arrangement, wherein: the inlet port is configured to receive the heat exchanging arrangement flow from a compressor higher pressure stage disposed at a compressor section aft end; a compressor lower pressure stage is disposed at a compressor section forward end; the compressor higher pressure stage has an operating pressure that is higher than the operating pressure in the compressor lower pressure stage; the compressor higher pressure stage has an operating temperature that is higher than the operating temperature in the compressor lower pressure stage; and the heat exchanging arrangement flow through the first pass channel is cooled while flowing from a region near the compressor higher pressure stage to a region near the compressor lower pressure stage.

A further embodiment of the foregoing heat exchanging arrangement, wherein: the inlet port is configured to receive the heat exchanging arrangement flow from a higher temperature stage of a turbine; and the heat exchanging arrangement flow through the first pass channel is cooled while flowing from a region near the turbine higher temperature stage to a region near a turbine lower temperature stage.

A further embodiment of the foregoing heat exchanging arrangement, wherein: at least one of the one or more other systems comprises a heat exchanger, a valve, an actuation system, a sensing device, or ducting; and the at least one of the one or more other systems is configured to receive the heat exchanging arrangement flow from the outlet port as a working fluid.

A further embodiment of the foregoing heat exchanging arrangement, wherein: the turnabout region is configured to direct the heat exchanging arrangement flow from the first pass channel to the second pass channel; the upstream end defines a forward end; the downstream end defines an aft end; and the second pass channel is configured to direct the heat exchanging arrangement flow in a direction from the forward end toward the aft end.

A further embodiment of the foregoing heat exchanging arrangement, wherein: the heat exchanging arrangement is disposed within a radial arc of the gas turbine engine case; the heat exchanging arrangement defines a precooler circumferential arc; and the precooler circumferential arc ranges from 5-180 degrees.

A further embodiment of the foregoing heat exchanging arrangement, wherein: the gas turbine engine case comprises nickel, aluminum, titanium, iron, cobalt, and/or alloys thereof; and the heat exchanging arrangement is integrated within the gas turbine engine case during an additive manufacturing process.

A precooler arrangement integrated within a gas turbine engine case, the precooler arrangement comprising one or more of the foregoing heat exchanging arrangements, each of the one or more heat exchanging arrangements disposed within a radial arc of the gas turbine engine case defining an associated precooler circumferential arc, wherein: a sum of the associated precooler circumferential arcs of the one or more heat exchanging arrangements defines a cumulative circumferential arc; a ratio of the cumulative circumferential arc to 360 degrees defines a precooler loading factor; and the precooler loading factor ranges from 10-80%.

The precooler arrangement of the preceding paragraph can optionally include, additionally and/or alternatively, any one or more of the following features, configurations and/or additional components:

A further embodiment of the foregoing precooler arrangement, wherein: the gas turbine engine case defines an engine case exterior surface; the gas turbine engine case is cooled by a gas turbine engine bypass flow; and the heat exchanging arrangement flow through the second pass channel is cooled by transferring heat to the engine case exterior surface.

A method of using a heat exchanging arrangement integrated within a gas turbine engine case to cool a portion of an airflow received from an inlet port, the gas turbine engine case at least partially enclosing a gas turbine engine, the gas turbine engine having an upstream end and a downstream end defined by a core fluid flow through the gas turbine engine, the heat exchanging arrangement comprising at least one flow passage defined within the gas turbine engine case having the inlet port and an outlet port, the at least one flow passage being configured to direct at least a portion of a fluid flowing through the gas turbine engine from between a downstream position and an upstream position while traveling between the inlet port and the outlet port, the method comprising: operating the gas turbine engine to pressurize the airflow received at the inlet port; directing the portion of the airflow through the inlet port, the heat exchanging arrangement, and the outlet port; and discharging the portion of the airflow from the outlet port to one or more other systems.

The method of the preceding paragraph can optionally include, additionally and/or alternatively, any one or more of the following features, configurations and/or additional components:

A further embodiment of the foregoing method, wherein directing the portion of the airflow through the heat exchanging arrangement further comprises directing the portion of the airflow through an interpass region disposed between the inlet port and the outlet port within the gas turbine engine case, the interpass region comprising: a first pass channel; a flow divider; a turnabout region; and a second pass channel; wherein: the flow divider is configured to provide a fluid separation between the first pass channel and the second pass channel; and the interpass region is configured to direct a fluid flow through the first pass channel, the turnabout region, and the second pass channel, thereby defining a heat exchanging arrangement flow.

A further embodiment of the foregoing method, wherein the heat exchanging arrangement defines an interior wall and an exterior wall; the interior wall partially forms a fluid boundary for the first pass channel; and the exterior wall partially forms a fluid boundary for the second pass channel.

A further embodiment of the foregoing method, wherein the interior wall defines an interior wall interpass surface; the flow divider defines a flow divider first pass surface and a flow divider second pass surface; and the exterior wall defines an exterior wall interpass surface.

A further embodiment of the foregoing method, wherein the flow divider is structurally supported between the interior wall and the exterior wall by a plurality of support vanes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanging arrangement comprising:
a gas turbine engine case at least partially enclosing at least a portion of a gas turbine engine, the gas turbine engine having an upstream end and a downstream end defined by a core fluid flow through the gas turbine engine;
the gas turbine engine case defines an engine case exterior surface and an engine case interior surface;
the heat exchanging arrangement is integrated within the gas turbine engine case between the engine case exterior surface and the engine case interior surface;
at least one flow passage of the heat exchanging arrangement is defined within the gas turbine engine case, the at least one flow passage having an inlet port and an outlet port, the at least one flow passage being configured to direct at least a portion of a fluid flowing through the gas turbine engine from between a downstream position and an upstream position while traveling between the inlet port and the outlet port, wherein the inlet port is defined through the engine case interior surface and the outlet port is defined through the engine case exterior surface;
the at least one flow passage further comprising an interpass region disposed between the inlet port and the outlet port within the gas turbine engine case,
the interpass region comprising:
a first pass channel;
a flow divider;
a turnabout region; and
a second pass channel radially outward of the first pass channel with respect to a center axis of the gas turbine engine;
wherein:
the flow divider is configured to provide a fluid separation between the first pass channel and the second pass channel;
the interpass region is configured to direct a fluid flow through the first pass channel, then through the turnabout region, and then through the second pass channel, thereby defining a heat exchanging arrangement flow; and
the heat exchanging arrangement flow is discharged from the outlet port; and
wherein the gas turbine engine case is cooled by a gas turbine engine bypass flow; and the heat exchanging arrangement flow through the second pass channel is cooled by transferring heat to the engine case exterior surface.

2. The heat exchanging arrangement of claim 1, wherein:
the heat exchanging arrangement defines an interior wall and an exterior wall;
the interior wall partially forms a first fluid boundary for the first pass channel; and
the exterior wall partially forms a second fluid boundary for the second pass channel.

3. The heat exchanging arrangement of claim 2, wherein:
the interior wall defines an interior wall interpass surface;
the flow divider defines a flow divider first pass surface and a flow divider second pass surface; and
the exterior wall defines an exterior wall interpass surface.

4. The heat exchanging arrangement of claim 3, wherein:
the flow divider is structurally supported between the interior wall and the exterior wall by a plurality of support vanes; and
the flow divider and the plurality of support vanes are integral to the gas turbine engine case.

5. The heat exchanging arrangement of claim 4, wherein at least some of the plurality of support vanes are configured to enhance heat transfer in the first and/or second pass channels.

6. The heat exchanging arrangement of claim 1, wherein:
the inlet port is configured to receive the heat exchanging arrangement flow from a higher temperature stage of a compressor; and
the heat exchanging arrangement flow through the first pass channel is cooled while flowing from a first region near the higher temperature stage of the compressor to a second region near a lower temperature stage of the compressor.

7. The heat exchanging arrangement of claim 1, wherein:
the inlet port is configured to receive the heat exchanging arrangement flow from a compressor higher pressure stage disposed at a compressor section aft end;
a compressor lower pressure stage is disposed at a compressor section forward end;
the compressor higher pressure stage has a first operating pressure that is higher than a second operating pressure in the compressor lower pressure stage;
the compressor higher pressure stage has a first operating temperature that is higher than a second operating temperature in the compressor lower pressure stage; and
the heat exchanging arrangement flow through the first pass channel is cooled while flowing from a first region near the compressor higher pressure stage to a second region near the compressor lower pressure stage.

8. The heat exchanging arrangement of claim 1, wherein:
the inlet port is configured to receive the heat exchanging arrangement flow from a higher temperature stage of a turbine; and
the heat exchanging arrangement flow through the first pass channel is cooled while flowing from a first region near the higher temperature stage of the turbine to a second region near a lower temperature stage of the turbine.

9. The heat exchanging arrangement of claim 1, wherein:
the turnabout region is configured to direct the heat exchanging arrangement flow from the first pass channel to the second pass channel;
the upstream end defines a forward end;
the downstream end defines an aft end; and
the second pass channel is configured to direct the heat exchanging arrangement flow in a direction from the forward end toward the aft end.

10. The heat exchanging arrangement of claim 1, wherein:
the heat exchanging arrangement is disposed within a radial arc of the gas turbine engine case;
the heat exchanging arrangement defines a precooler circumferential arc; and
the precooler circumferential arc ranges from 5-180 degrees.

11. The heat exchanging arrangement of claim 1, wherein:
the gas turbine engine case comprises nickel, aluminum, titanium, iron, cobalt, and/or alloys thereof; and
the heat exchanging arrangement is integrated within the gas turbine engine case during an additive manufacturing process.

12. A precooler arrangement integrated within the gas turbine engine case, the precooler arrangement comprising one or more of the heat exchanging arrangements of claim 1, each of the one or more of the heat exchanging arrangements disposed within a radial arc of the gas turbine engine case defining an associated precooler circumferential arc, wherein:
- a sum of the associated precooler circumferential arc of the one or more of the heat exchanging arrangements defines a cumulative circumferential arc;
- a ratio of the cumulative circumferential arc to 360 degrees defines a precooler loading factor; and
- the precooler loading factor ranges from 10-80%.

13. A method comprising:
- using a heat exchanging arrangement integrated within a gas turbine engine case to cool a portion of an airflow received at an inlet port, the gas turbine engine case at least partially enclosing at least a portion of a gas turbine engine, the gas turbine engine having an upstream end and a downstream end defined by a core fluid flow through the gas turbine engine, the gas turbine engine case defining an engine case exterior surface and an engine case interior surface; the heat exchanging arrangement is integrated within the gas turbine engine case between the engine case exterior surface and the engine case interior surface; the heat exchanging arrangement comprising
  - at least one flow passage of the heat exchanging arrangement defined within the gas turbine engine case, the at least one flow passage having the inlet port and an outlet port, the at least one flow passage being configured to direct the portion of the airflow received at the inlet from between a downstream position and an upstream position while traveling between the inlet port and the outlet port, wherein the inlet port is defined through the engine case interior surface and the outlet port is defined through the engine case exterior surface, the method further comprising:
operating the gas turbine engine to pressurize the portion of the airflow received at the inlet port;
directing the portion of the airflow through the inlet port, the heat exchanging arrangement, and the outlet port, wherein directing the portion of the airflow through the heat exchanging arrangement further comprises directing the portion of the airflow through an interpass region disposed between the inlet port and the outlet port within the gas turbine engine case, the interpass region comprising:
a first pass channel;
a flow divider;
a turnabout region; and
a second pass channel;
wherein:
the flow divider is configured to provide a fluid separation between the first pass channel and the second pass channel; and
the interpass region is configured to direct the portion of the airflow through the first pass channel, then through the turnabout region, and then through the second pass channel, thereby defining a heat exchanging arrangement flow; and
discharging the portion of the airflow from the outlet port.

14. The method of claim 13, wherein:
the heat exchanging arrangement defines an interior wall and an exterior wall;
the interior wall partially forms a fluid boundary for the first pass channel; and
the exterior wall partially forms a fluid boundary for the second pass channel.

15. The method of claim 14, wherein:
the interior wall defines an interior wall interpass surface;
the flow divider defines a flow divider first pass surface and a flow divider second pass surface; and
the exterior wall defines an exterior wall interpass surface.

16. The method of claim 15, wherein the flow divider is structurally supported between the interior wall and the exterior wall by a plurality of support vanes.

* * * * *